US007668134B2

United States Patent
Hosein et al.

(10) Patent No.: US 7,668,134 B2
(45) Date of Patent: Feb. 23, 2010

(54) OPTIMAL FREQUENCY OF WALSH MASK BROADCAST FOR FORWARD HIGH-SPEED PACKET DATA CHANNELS

(75) Inventors: Patrick A. Hosein, San Diego, CA (US); Srinivasan Balasubramanian, San Diego, CA (US); Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 824 days.

(21) Appl. No.: 10/994,844

(22) Filed: Nov. 22, 2004

(65) Prior Publication Data

US 2005/0195759 A1    Sep. 8, 2005

Related U.S. Application Data

(60) Provisional application No. 60/550,399, filed on Mar. 5, 2004.

(51) Int. Cl.
*H04W 4/00* (2009.01)
(52) U.S. Cl. ...................................... 370/329
(58) Field of Classification Search ................ 455/450; 370/329, 330, 338, 310, 235, 209, 210; 375/344, 375/317, 303–307
See application file for complete search history.

(56) References Cited

U.S. PATENT DOCUMENTS

| | | | |
|---|---|---|---|
| 5,805,585 A * | 9/1998 | Javitt et al. ................... | 370/342 |
| 6,459,693 B1 * | 10/2002 | Park et al. ..................... | 370/342 |
| 6,473,395 B1 | 10/2002 | Lee | |
| 2003/0025623 A1 * | 2/2003 | Brueske et al. ............... | 341/139 |

(Continued)

FOREIGN PATENT DOCUMENTS

EP    1 189 375    10/2002

OTHER PUBLICATIONS

Vannithamby R et al: "Optimal frequency of Walsh mask broadcast for forward high-speed wireless packet data channels" Vehicular Technology Conference, 2004. VTC2004-Fall. 2004 IEEE 60th Los Angeles, CA USA Sep. 26-29, 2004, Piscataway, NJ, USA, IEEE, vol. 2, Sep. 26, 2004; ISBN: 0-7803-8521-7.

(Continued)

*Primary Examiner*—Patrick N Edouard
*Assistant Examiner*—Shantell Heiber
(74) *Attorney, Agent, or Firm*—Coats & Bennett, P.L.L.C.

(57) ABSTRACT

A base station in a wireless communication network multi-codes a shared packet data channel using a continually changing set of spreading codes, and dynamically updates the transmission frequency of messages identifying the spreading codes to be used for that multi-coding based on tracking the net gain in data throughput for the shared channel that is obtained by transmitting such messages. In a 1xEV-DV network context, for example, a Walsh code in the defined Walsh code space that is not contiguous with the Walsh codes currently allocated to multi-coding the 1xEV-DV Forward Packet Data Channel (F-PDCH) generally remains unavailable for such use until an updated Walsh Mask Broadcast (WMB) message is transmitted to the mobile stations being served on the F-PDCH. The base station thus is configured to determine the frequency at which to send such messages and thereby make the unavailable codes available for multi-coding use.

20 Claims, 4 Drawing Sheets

U.S. PATENT DOCUMENTS

2003/0039204 A1* 2/2003 Tiedemann, Jr. ............ 370/209
2003/0103491 A1* 6/2003 Frederiksen et al. ........ 370/351
2003/0147454 A1 8/2003 Kwon et al.
2005/0124348 A1* 6/2005 Gaal et al. ................. 455/450

OTHER PUBLICATIONS

Soong A C K et al: "Forward high-speed wireless packet data service in IS-2000-1*EV-DV"; IEEE Communications Magazine IEEE USA, vol. 41, No. 8, Aug. 2003; XP002330590; ISSN: 0163-6804.

* cited by examiner

OPTIMAL FREQUENCY OF WALSH MASK BROADCAST FOR FORWARD HIGH-SPEED PACKET DATA CHANNELS

RELATED APPLICATIONS

The instant application claims priority under 35 U.S.C. § 119(e) from the U.S. provisional patent application filed on 5 Mar. 2004, entitled "Optimal Frequency of Walsh Mask Broadcast for Forward High-Speed Wireless Packet Data Channels," and assigned Application Ser. No. 60/550,399. This application expressly incorporates the contents of the '399 provisional application by reference herein.

BACKGROUND OF THE INVENTION

The present invention generally relates to wireless communication networks, and particularly relates to the use of channel coding resources on shared packet data channels.

Wireless communication networks based on Code Division Multiple Access (CDMA) generally transmit different streams of information on different code channels using orthogonal or quasi-orthogonal codes. Walsh codes of varying length stand as one example of such codes, and they find widespread use in wireless networks based on cdma2000 and Wideband CDMA (W-CDMA) standards, for example.

A traditional approach to using Walsh codes involves the assignment of specific Walsh codes of desired lengths to each user. Accordingly, one or more of the available Walsh codes at a given network transmitter are used to create the dedicated code channel(s) assigned to each user, and additional codes are dedicated as needed for the various broadcast, control, and overhead signaling channels. Control logic in the network handles allocating and deallocating individual codes from the available set of codes dynamically in response to users being added or dropped from the network on an ongoing basis.

Newer network standards depart from the traditional approach of dedicating Walsh code resources to individual users, at least on the forward data link. For example, IS-2000 Revisions C and D represent attempts at satisfying the ever-present push for higher speed mobile data services. These revisions, often referred to as "1xEV-DV" (shorthand for 1× radio transmission technology Evolution for high-speed integrated Data and Voice), introduce a high-speed shared forward packet data channel, referred to as the "Forward Packet Data Channel" or F-PDCH, that uses multiple Walsh codes to provide high-speed packet data services to the users sharing that channel. The High Speed Downlink Packet Access (HSDPA) channel of W-CDMA makes similar use of multiple codes to increase the available data rates on a shared packet data channel.

In 1xEV-DV, the F-PDCH is a rate-controlled channel rather than a power-controlled channel. It comprises an ongoing series of time slots—e.g., 1.25 ms/slot—with each slot of the F-PDCH generally comprising a multi-coded data transmission targeted to a given one of the mobile stations sharing the F-PDCH. Some type of "scheduler" generally manages time-sharing of the channel, so that each user sharing the channel can be served within the constraints of that user's radio conditions. In particular, the data rate used to serve each user at any given instant depends on the radio conditions dynamically reported by that user, the transmit power currently available for the F-PDCH, and the number of Walsh codes currently available for the F-PDCH. Scheduling and other transmission information associated with the F-PDCH is sent to the mobile stations sharing that channel via a Forward Packet Data Control Channel (F-PDCCH).

For a given transmit power availability, the maximum data rate achievable on the F-PDCH at any given instant depends on the number of Walsh codes available to it. Coding on the F-PDCH uses multiples, not necessarily contiguous, of length-32 Walsh codes from the defined Walsh (code) space. This approach is called multi-code CDMA (MCCDMA), and the more codes available for multi-coding the F-PDCH transmissions, the higher the achievable data rate.

In contrast, in previous revisions of the IS-2000 standards, Walsh code resources were solely dedicated to individual users, and higher data rates for individual users were achieved by increasing the length of the Walsh codes dedicated to them. Hence, to make the multi-coding methodology used for the F-PDCH backwards compatible, the F-PDCH is configured to use the "leftover" Walsh codes not dedicated to other channels. With this approach, Walsh codes are assigned as needed to control and signaling channels, and to traditional voice and data users, with the remaining Walsh codes available for use on the F-PDCH. More particularly, the F-PDCH can use up to 28 length-32 Walsh codes, with the rest of the Walsh codes used for control and signaling purposes, and for conventional voice/data channels.

Mobile stations receiving data on the F-PDCH have to know exactly which Walsh codes are being used in multi-coding the transmissions. Theoretically, the Walsh codes used for the F-PDCH can change every 1.25 ms—the "slot" timing of the F-PDCH—as the conventional voice/data channels occupy or abandon Walsh codes with the arrival or departure of conventional voice/data users. Randomness in that arrival/departure process creates fragmentation in the Walsh space, resulting non-contiguous leftover codes in the Walsh space. Hence, the typical network Base Station (BS) transmits a broadcast message on the F-PDCCH to apprise mobile stations of the ever-changing allocation of leftover Walsh codes being used for the F-PDCH.

Thus, running the F-PDCH at the highest data rates permitted by the instantaneously prevailing conditions—transmit power availability, user radio conditions, etc.—depends on adding length-32 Walsh codes to the multi-coding set used for the F-PDCH, as soon they become available. However, adding a Walsh code the multi-coding set generally requires notifying the mobile stations of the change.

The 1xEV-DV standard defines a Walsh Mask Broadcast (WMB) message that is transmitted on the F-PDCCH, and which comprises a "bit map" marking pairs of length-32 Walsh codes available for multi-coding on the F-PDCCH. The WMB message comprises 21 bits and the time consumed on the F-PDCCH by its transmission displaces control information needed for controlling the F-PDCH. Transmission of the WMB message thus imposes a throughput penalty on the F-PDCH.

At the same time, however, transmission of the WMB message offers a throughput benefit in that it allows the mobile stations to be informed of one or more additional Walsh codes newly available for multi-coding on the F-PDCH. One challenge, then, lies in determining at any given time whether the benefit of transmitting an updated WMB message outweighs the penalty that will be incurred by its transmission.

SUMMARY OF THE INVENTION

In certain types of wireless communication networks that use a variable number of spreading codes to perform multi-coding on a shared packet data channel, the ability to add non-contiguous spreading codes to the set used for multi-coding depends on sending a multi-coding information message to the mobile stations receiving multi-coded transmissions on the shared channel. Adding spreading codes via such messaging tends to increase throughput on the shared channel but transmitting such messages conversely tends to decrease throughput because of the attendant transmission overhead. The present invention therefore comprises a method and apparatus to control the transmission frequency of such multi-coding information messages dynamically based on evaluating their throughput benefit versus their throughput burden.

For example, at a base station that uses an ever-changing set of "leftover" spreading codes for multi-coding a shared packet data channel, one embodiment of the present invention comprises a method of adding spreading codes to the multi-coding set based on messaging the mobile stations sharing the packet data channel as a function of evaluating the net gain in data throughput on the shared channel. The method is based on determining that one or more spreading codes in an overall set of spreading codes have become newly available for use in multi-coding the shared packet data channel, and selectively messaging the mobile stations sharing the packet data channel based on determining whether a data throughput increase gained by adding the one or more spreading codes to the multi-coding set outweighs a data throughput loss incurred by forfeiting data transmission time on the shared packet data channel in order to carry out the messaging.

In one embodiment, the base station comprises a 1xEV-DV base station and the shared packet data channel comprises a F-PDCH being transmitted by the base station. In this context, the multi-coding information message for which the message transmission frequency is to be dynamically adjusted based on the throughput gain/loss evaluation comprises a WMB message. Thus, selectively messaging the mobile stations comprises selectively sending a WMB message from the base station for the F-PDCH. Note, that a given 1xEV-DV base station can be configured to provide radio coverage in a number of sectors, and it should be understood that the method can be applied to each F-PDCH transmitted from the base station.

Thus, the present invention comprises in one or more embodiments a method of controlling the transmission frequency of WMB messages from a base station in a wireless communication network for a shared, forward link packet data channel. That method includes tracking a net gain in data throughput for the packet data channel obtained by transmitting WMB messages to mobile stations being served on the packet data channel, and dynamically adjusting the transmission frequency of WMBs to increase the net gain.

Dynamically adjusting the transmission frequency of the WMB messages to increase the net gain can comprise incrementally increasing or decreasing a default value for the transmission frequency as a function of tracking the net gain. For example, the base station can be configured to incrementally increase the transmission frequency if the net gain is increasing responsive to said incremental increases, and to incrementally decrease the transmission frequency if the net gain is increasing responsive to said incremental decreases.

Regardless, tracking the net gain can comprise expressing the net gain as a difference between data throughput gains associated with increasing the number of Walsh code available for multi-coding the packet data channel via transmission of the WMB messages, and data throughput losses associated with forfeiting transmit slots on the packet data channel for the transmission of the WMB messages.

A correspondingly configured base station comprises one or more processing circuits that are configured to track a net gain in data throughput for the packet data channel obtained by transmitting WMB messages to mobile stations being served on the packet data channel, and dynamically adjust a transmission frequency of the WMB messages to increase the net gain. The processing circuit(s) may comprise general or special-purpose microprocessors, and may comprise dedicated or shared base station processing resources. In one embodiment, the processing circuits comprise one or more microprocessor-based circuits configured to execute stored program instructions embodying the dynamic control of the frequency of WMB message transmissions, as described and claimed herein.

Of course, the present invention's message transmission frequency control methods are not limited to cdma2000 embodiments (e.g., 1xEV-DV), nor limited to the above features and advantages. Those skilled in the art will recognize additional features and advantages upon reading the following detailed description, and upon viewing the accompanying figures.

BRIEF DESCRIPTION OF THE DRAWINGS

One or more embodiments of the present invention are illustrated in the accompanying drawings, wherein.

DETAILED DESCRIPTION OF THE INVENTION

Figure 1:
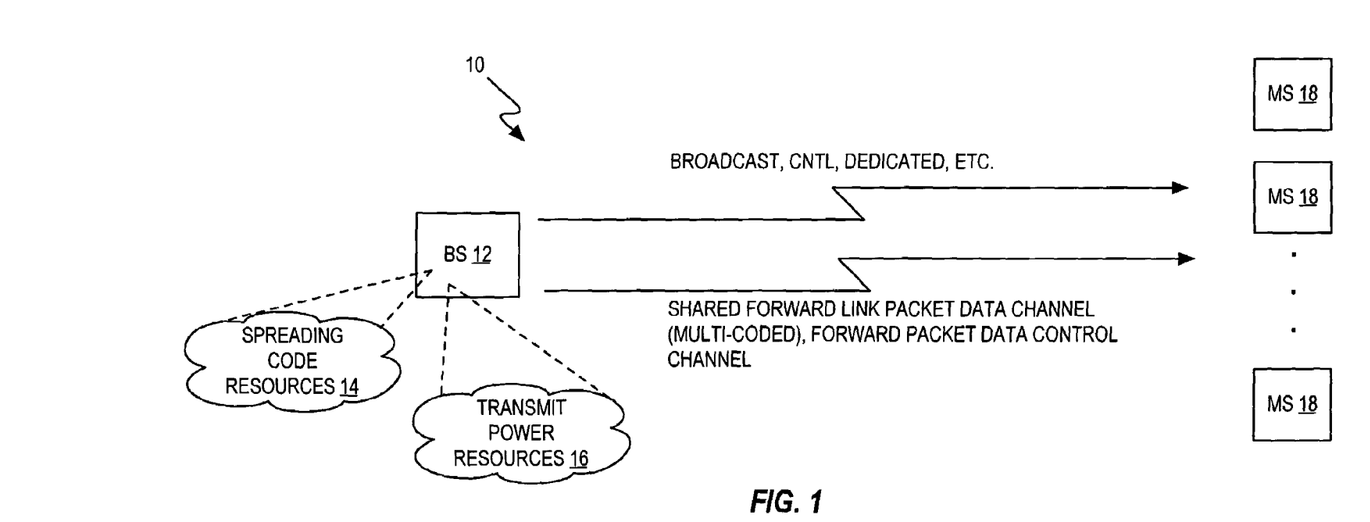
FIG. 1 partially illustrates a wireless communication network including a base station 12.

FIG. 1 provides a partial illustration of a wireless communication network, including a base station 12 having spreading code resources 14 and transmit power resources 16 available to it for transmitting various broadcast, control, and dedicated channels on the forward link. Base station 12 further transmits a shared packet data channel on the forward link. These various channels are used to serve a plurality of mobile stations 18. Generally, some of the mobile stations will be provided desired voice and/or packet data services using user-specific dedicated channels, and some of the mobile stations 18 will be provided desired packet data services using a high-speed forward link packet data channel that is time-shared by one or more of the mobile stations 18.

In particular, some types of wireless communication networks, such as those based on the 1xEV-DV standards, provide high-speed packet data services on a shared forward link packet data channel using whatever base station transmit power and spreading code resources are left over after the allocation of spreading codes and transmit power to the various broadcast, control, and dedicated channels being transmitting from the base station 12. According to such operation, the spreading code and transmit power resources available for the shared forward link packet data channel vary over time.

In particular, the arrival and departure of users (mobile stations) requiring dedicated channels, which are spread using specifically assigned spreading codes, determines the availability of leftover spreading codes in the defined spreading code space that can be used for the shared packet data channel. Specifically, in 1xEV-DV networks, the achievable data rate on the shared packet data channel is determined by the number of individual length 32 Walsh Codes available for "multi-coding" the shared packet data channel. Thus, when spreading codes previously allocated to dedicated channel coding become available in association with the departure of one or more dedicated-channel users, base station 12 may be presented with an opportunity to add one or more appropriate length Walsh codes to the multi-coding set being used by it for encoding user data onto the shared packet data channel.

The 1xEV-DV standards define two types of information that can be transmitted by base station 12 to provide mobile stations 18 with updated information regarding the spreading codes available for multi-coding the shared packet data channel. The previously mentioned WMB message is defined as a "bit map" mask that marks two length-32 Walsh codes available for multi-coding, and thus can be used to mark non-contiguous codes within the Walsh code space. Supplementing the WMB message, the 1xEV-DV standards further define a Last Walsh Code Index value (LWCI) that can be used to mark the last length-32 Walsh code used within a contiguous block of available Walsh codes. Thus, while the LWCI value can be used to identify the last used length-32 Walsh code within a length-32 pair marked in the WMB message as used, it cannot be used to "jump" over non-contiguous blocks of available Walsh codes within the code space. In other words, a new (updated) WMB message must be sent to the mobile stations 18 to add newly available but non-contiguous Walsh codes to the multi-coding set used for coding the F-PDCH.

Figure 2:
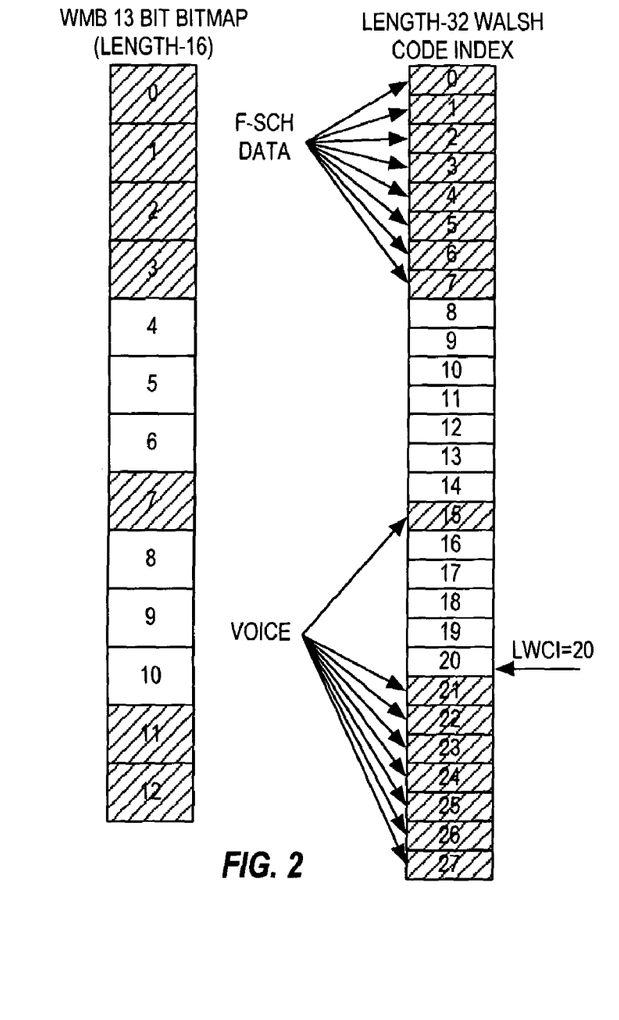
FIG. 2 illustrates a multi-coded shared, packet data channel and associated control channel.

FIG. 2 illustrates the relationship between the WMB message's bit mask and the LWCI value, in terms of how they identify the particular Walsh codes available for multi-coding the F-PDCH. In particular, one sees a 13-bit bitmap of length-16 Walsh codes that, with respect to some given instant in time, marks those codes that are allocated to dedicated channels, and those that are available for multi-coding the F-PDCH. Note that codes from the "top" of the code space downward may be allocated to Forward Supplemental Channels (F-SCHs), which typically are dedicated to individual packet data users not receiving high-rate packet data services on the F-PDCH. Similarly, codes from the "bottom" of the code space upward may be allocated to dedicated voice and low-rate data users. The leftover codes available for multi-coding thus are indicated by the WMB message's bit map mask and the LWCI's pointer value. In particular, the latter specifies the last length-32 Walsh code index that should be included for the F-PDCH reception. The WMB broadcast is generally chosen to be a slow process because of its overhead, but the LWCI is a fast process, since every F-PDCH transmission carries the LWCI field in the associated F-PDCCH control message.

Figure 3:
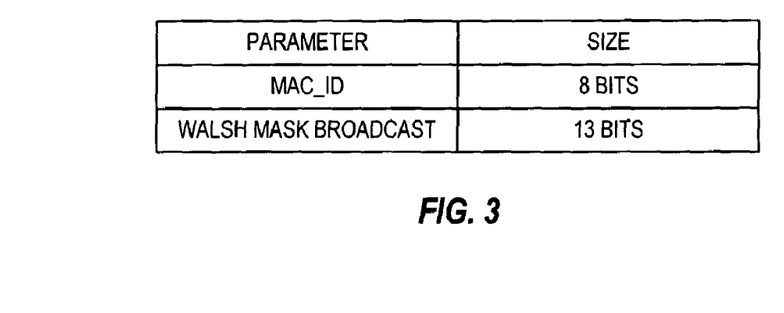
FIG. 3 illustrates non-contiguous use of available spreading codes within a defined spreading code space for multi-coding shared packet data channel.
Figure 4:
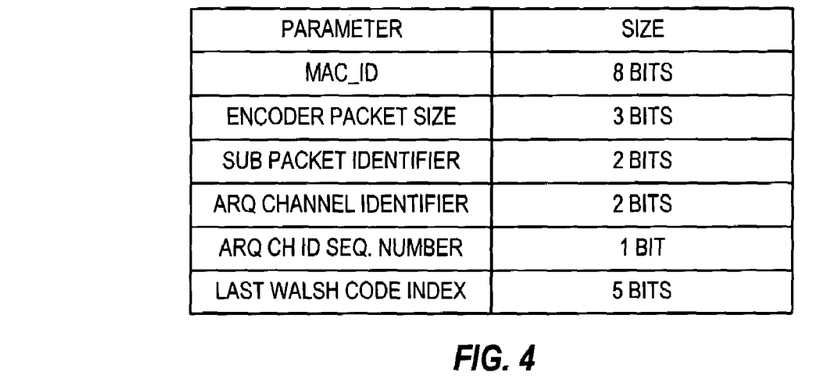
FIG. 4 illustrates the parameters associated with sending packet data control information for the shared packet data channel, including the transmission of a Last Walsh Code Index value.

FIG. 3 illustrates an embodiment of the WMB message, as transmitted on the F-PDCCH. It comprises 21 bits, including an 8-bit Medium Access Control Identification (MAC_ID) parameter, and a 13-bit bit mask that marks pairs of length-32 Walsh codes as available or unavailable for multi-coding the F-PDCH—note that the WMB message does not provide enough bits to mark the availability of individual length-32 Walsh codes. When the WMB message is not being transmitted on the F-PDCCH, the LWCI value can be sent on the F-PDCCH as part of the normal control information used for controlling data reception by the mobile stations 18 on the F-PDCH. Thus, FIG. 4 illustrates the parameters sent per transmission on the F-PDCCH, which include the parameters needed to enable data reception by mobile stations 18 on corresponding slots of the F-PDCH, along with the LWCI value.

Figure 5:
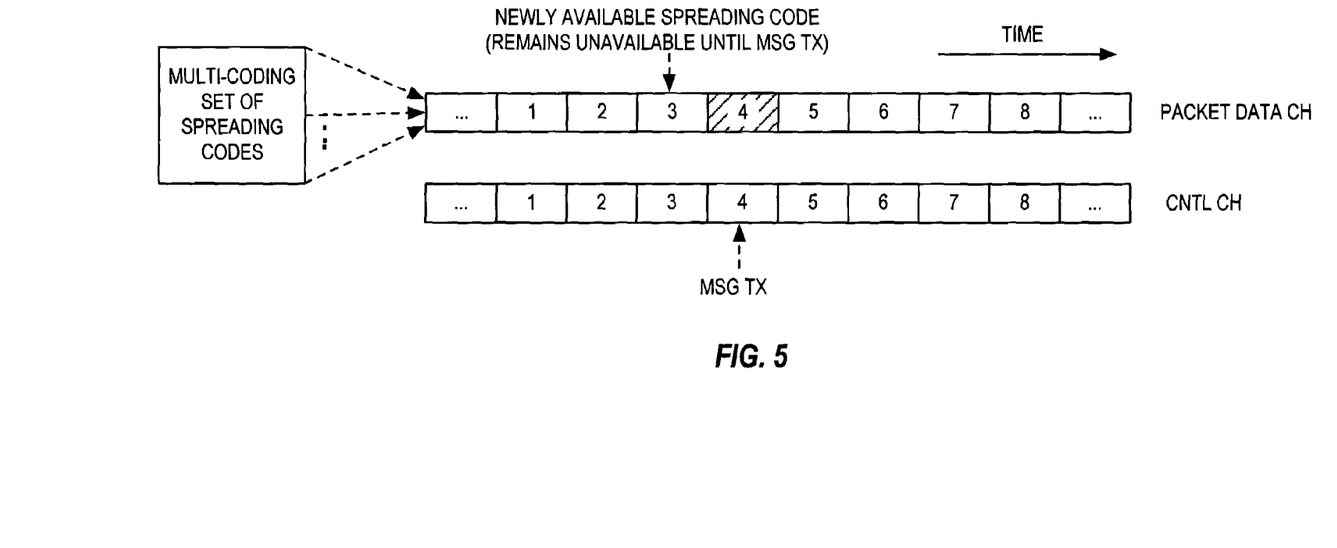
FIG. 5 illustrates the parameters associated with transmitting a spreading code information update message (e.g., A Walsh Mask Broadcast message)

Because of its size, transmission of the WMB message on the F-PDCCH leaves no room in the slot(s) for transmitting the parameters needed to control data reception by the mobile stations 18 on the corresponding slot(s) of the F-PDCH. Therefore, transmission of the WMB message "forfeits" data transmission capacity on the F-PDCH, unless one chooses to concurrently send a second F-PDCCH transmission with the requisite control information. FIG. 5 generically illustrates WMB transmission, wherein a spreading code becomes newly available for multi-coding a shared packet data channel sometime in Slot 3 of the packet data channel. To inform the mobile stations 18 receiving data on that channel, the network transmits a "TX MSG" in Slot 4 of the associated control channel in Slot 4, thereby leaving Slot 4 of the data channel unavailable for use in transmitting data. Of course, it should be understood that the number of control channel slots needed to transmit updated spreading code information and the number of slots forfeited on the data channel may vary depending upon the particular type of network. As an example applicable to cdma2000, transmissions can be sent on 1, 2, or 4 slots, corresponding to intervals of 1.25 ms, 2.5 ms, and 5 ms.

Thus, while the WMB message identifies the potentially non-contiguous Walsh codes that will be used for multi-coding the F-PDCH, sending it imposes transmission overhead because it leaves the F-PDCCH slot on which it is sent unavailable for controlling the reception of data on the corresponding slot of the F-PDCH, thereby forfeiting that slot of the F-PDCH in terms of data transmission capacity. Base station 12 is therefore presented with a control dilemma, wherein transmission of the WMB message allows for the addition of non-contiguous Walsh codes to the multi-coding set, which increases the achievable data rate of the F-PDCH. Increasing the achievable data rate theoretically increases the data throughput of the F-PDCH, but sending the WMB message forfeits a data transmission slot on the F-PDCH, and therefore causes some decrease in data throughput.

According to the present invention, base station 12 is configured to adjust the transmission frequency of multi-coding information update messages (e.g., WMB messages) as a function of evaluating the net gain in data throughput on the F-PDCH associated with transmission of those messages. In this sense, net gain represents the data throughput increase gained by adding the one or more spreading codes to the multi-coding set offset by the data throughput decrease incurred by forfeiting data transmission time on the F-PDCH in order to carry out that messaging.

Figure 6:
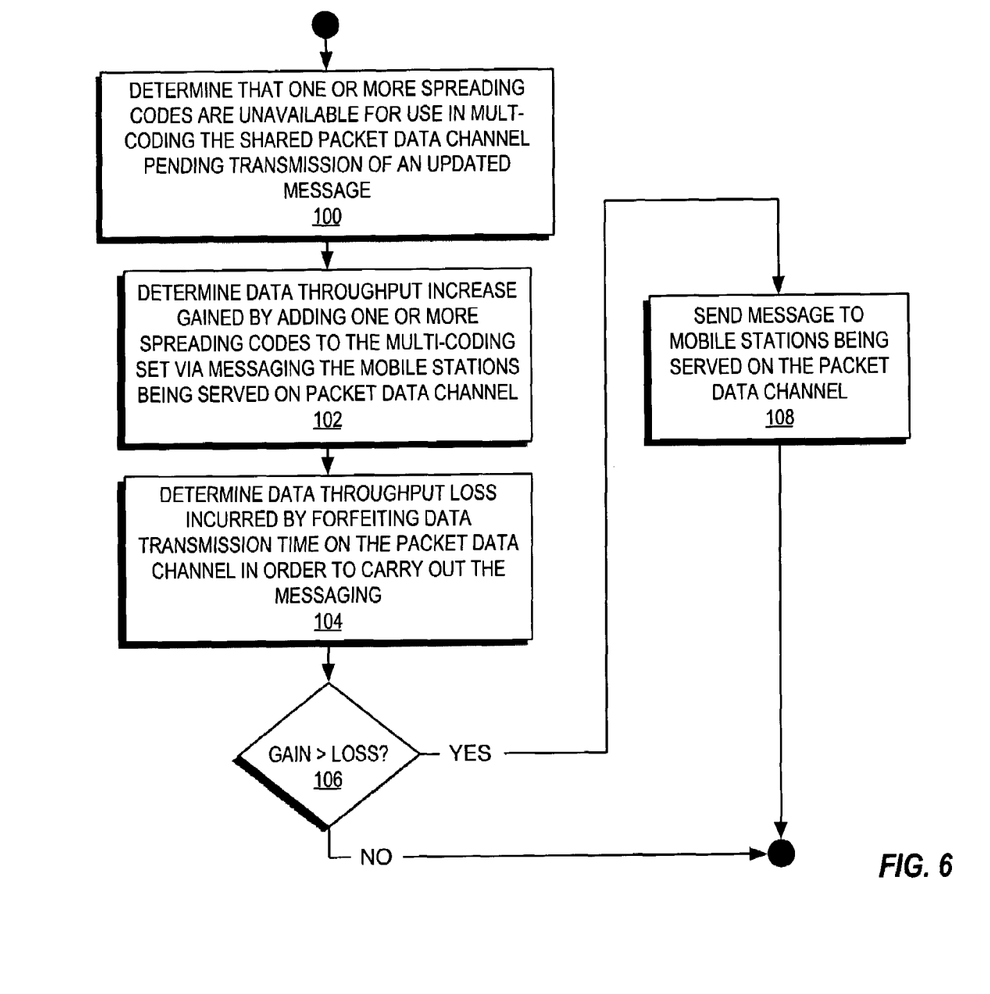
FIG. 6 illustrates one embodiment of base station processing logic configured to send spreading code information update messages on a selective basis responsive to evaluating the benefit of sending such message in comparison with the burden of sending such messages.

FIG. 6 illustrates one embodiment of the present invention, wherein base station 12 is configured to carry out a method of transmitting WMB messages, or the like, according to a transmission frequency that is adjusted dynamically as a function of tracking the net gain in data throughput on the packet data channel obtained by transmission of the WMB messages. In particular, in one embodiment, the message transmission frequency is adjusted dynamically to optimize the net gain in data throughput.

Processing begins with base station 12 determining that one or more spreading codes have become newly available for use in multi-coding the share packet data channel (Step 100). Base station 12 determines the data throughput increase gained by adding the one or more spreading codes to the multi-coding set via messaging the mobile stations being served on the packet data channel (Step 102) and determines the data throughput loss incurred by forfeiting data transmission time on the packet data channel in order to carry out that messaging (Step 104).

In making its decision on selective transmission of the multi-coding information message, base station 12 compares the data through gain versus the data throughput loss (Step 106). If the gain in throughput exceeds the loss, base station 12 sends the message to the mobile stations being served on the packet data channel (Step 108), otherwise it does not send the message.

In looking at this broad processing methodology in more detail, one notes that Walsh space fragmentation generally cannot be avoided because of the random nature of the arrival/ departure process associated with users requiring dedicated Walsh code allocations. Thus, base station 12 uses a combination of WMB message broadcast and LWCI value updates to keep the mobile stations 18 that are receiving data on the F-PDCH apprised of the Walsh codes being used in for multi-coding the FPDCH without any ambiguity.

In this context, several triggers can be used to update the Walsh mask transmitted in the WMB messages. A non-exhaustive list of triggers includes these items: (1) periodic updating to synchronize the mobile stations 18, and to make sure they all have the appropriate Walsh mask; (2) to accommodate newly arriving mobile station 18 coming in as new assignments or coming in from neighboring sectors; (3) Walsh code availability changes arising when Walsh codes are taken or freed up by F-SCH users, for example. Note that when Walsh codes are freed up by departing voice call users, the Walsh mask broadcast can be sent to optimize the Walsh code utilization.

With the above in mind, then, one embodiment of the present invention configures base station 12 to determine the WMB message broadcast frequency that maximizes data throughput on the F-PDCH. Determination of that frequency may be analyzed in terms of how long a Walsh code that otherwise could be used for multi-coding the F-PDCH remains unavailable for such use because base station 12 defers the transmission of a WMB message. That is, when a given user departs, Walsh code that was allocated to that user generally represents a newly available Walsh code that can be used for multi-coding the F-PDCH. However, if that newly freed code cannot be indicated as available for F-PDCH multi-coding by adjustment of the LWCI value, it will remain "unavailable" for such use until the base station 12 transmits an updated WMB message.

Such unavailable, non-contiguous codes, or code blocks, within the Walsh space may be envisioned as "holes," and one may let $\lambda$ denote the average rate of creation of these "holes" in the Walsh code space. Such codes remain unavailable for F-PDCH multi-coding for some period of time until transmission of an updated WMB message. One may denote the average value of this holding time by $\kappa$. Note that these Walsh codes generally are available for new voice connections, but it of interest herein that they generally are not available for use with the F-PDCH until a WMB broadcast is performed.

In steady state, the average number of these unavailable codes, U, is therefore given by the expression $U=\lambda\kappa$. U may be assumed to be an integer value. (The nearest integer function can be used if necessary to obtain U as an integer value.)

In steady state and with no Walsh code broadcasts, assume that an average of N Walsh codes are used for the F-PDCH. Therefore if, in the steady state, a WMB broadcast is made, then an average of N+U codes become available for the F-PDCH and this number gradually drops down to N unless another WMB broadcast is made.

Let R(N) denote the sector throughput when N Walsh codes are available to the F-PDCH. If the currently freed but unavailable codes were to be made available to the F-PDCH by transmitting a WMB broadcast, then the F-PDCH throughput can be increased to R(N+U). Note that one may assume that the leftover transmit power available to the F-PDCH during this control period is constant.

Supposing that WMB broadcasts are thus used to reduce the average number of unavailable codes, it may be noted that a default WMB transmission frequency can be adopted, and then dynamically adjusted in a manner that tends to optimize, or at least improve, F-PDCH data throughput. For example, base station 12 can be configured to make WMB broadcasts at time instants when a newly freed Walsh code becomes unavailable to the F-PDCH without benefit of transmitting an updated WMB message. That is, WMB messages can be transmitted whenever a newly freed Walsh codes is unavailable for F-PDCH multi-coding unless an updated WMB message is sent.

However, assume that instead of sending an updated WMB broadcast at the instant a code become unavailable, a broadcast is made at some later time t, wherein the last unavailable code was created at time $t-\epsilon$. Had the broadcast been made instead at time $t-\epsilon$, then a greater data throughput would have been experienced during the period $[t-\epsilon, t]$ and hence the system performance can be improved by contradicting a default assumption that an optimal broadcast transmission frequency was being used by base station 12.

Given the above, base station 12 can be configured to make a selective WMB broadcast decisions whenever a Walsh code becomes unavailable for F-PDCH multi-coding without benefit of transmitting and updated WMB message. In one or more embodiments of the present invention, changing the broadcast frequency of the WMB messages is configured as a slow control process, so one may assume that the WMB broadcasts are made every mth occurrence of a Walsh code becoming unavailable. A value m=1 means that a broadcast is made every time that a Walsh becomes unavailable. In this case the average number of unavailable Walsh codes becomes 0 and the Walsh code broadcast rate becomes $\lambda$. Naturally there is a tradeoff between the gain in throughput with increased broadcast and the increase in broadcast overhead.

The problem objective for base station processing thus is the determination of the broadcast frequency value m such that the overall (net) gain G(m) in data throughput on the F-PDCH is maximized. Realizing that objective is based on determining the average increase in throughput as a function of m. Consider the case in which $m \leq U$. Therefore a broadcast is made before the number of unavailable Walsh codes reaches the steady state value. The average throughput as a function of m is given by $$\overline{R}(m) = \frac{1}{m}\sum_{i=1}^{m} R(N + U - i + 1). \tag{1}$$

If m>U, it is assumed that once the number of unavailable codes reaches U, then it remains at that value. With that case, the average throughput becomes $$\overline{R}(m) = \frac{1}{m}\left((m-U)R(N) + \sum_{i=1}^{m} R(N+U-i+1)\right). \quad (2)$$

By assuming that each WMB broadcast forfeits a single F-PDCH slot and denoting a slot size by $\tau$, and assuming that the WMB broadcast is performed just before the unavailable codes can be used, then the potential data throughput on the F-PDCH at that point in time is given by $$B(m) = R(\max\{N, N+U-m+1\}). \quad (3)$$

The number of bits that could have been transmitted on the F-PDCH but for transmission of the WMB message is given by $B(m)\tau$. The time between these broadcasts is given by $m/\lambda$ and hence the loss in sector throughput is given by $B(m)\lambda\tau/m$. Therefore, throughput gain, $G(m)$, can be expressed as a function of m based on the difference between the gain (from the increased allocation of Walsh codes for multi-coding the F-PDCH) and the throughput loss (due to the forfeited F-PDCH slot). This gain can therefore be written as $$G(m) = \overline{R}(m) - R(N) - \frac{B(m)\lambda\tau}{m}, \quad (4)$$

and the optimization problem becomes one of determining the decision variable m that maximizes the net data throughput gain for the F-PDCH.

The case m=1 is given as $G(1)=R(N+U)(1-\lambda\tau)-R(N)$, and $\lambda$, which is the frequency of hole creation in the Walsh code space. (Note that the duration between hole creations generally is on the order of hundreds of milliseconds.) However, the value of $\tau$ generally is on the order of a few milliseconds. Therefore, $\lambda\tau<<1$ and, since $R(N+U)>R(N)$, $G(1)>0$ for sufficiently large values of U. On the other hand, $G(1)<0$ for sufficiently small U. Also note that if multiple slots on the F-PDCH are forfeited for each WMB broadcast, increasing the value of T accounts for that condition. Note that as m goes to infinity, $R(m)$ approaches $R(N)$ from above while $B(m)/m$ approaches zero and, hence, $G(m)$ goes to zero.

In an illustrative example of the above processing method, one may assume that the achievable data rate on the F-PDCH is linearly proportional to the number of Walsh codes allocated to it for multi-coding—i.e., $R(N)=\alpha N$. Considering the case of U=1, $\overline{R}(1)=\alpha(N+1)$, $R(N)=\alpha N$ and $B(1)=N+1$. Thus $G(1)=\alpha(1-\lambda\tau(N+1))$. For m>1, then, $\overline{R}(m)=\alpha(N+1/m)$, $b(m)=\alpha N$ and hence $G(m)=(1-N\lambda\tau)/m$. Therefore $G(m)$ tends to zero as m tends to infinity. If $G(1)>0$ and $G(1)>G(2)$, then the optimal value m is 1—i.e., transmit the WMB message each time a new Walsh code can be added to the multi-coding set. However, if $G(2)>G(1)$, then the optimal value of m is two, meaning that transmission of the WMB message is deferred until at least two codes are unavailable pending transmission of the WMB message.

In one or more embodiments, the product of $N\lambda\tau$ typically is much less than 1 and m=1 therefore stands as an optimal value. Since m=1 means that one Walsh code is free for multi-coding but unavailable for such use until an updated mobile stations 18. Thus, base station 12 can be configured to transmit WMB messages each time a Walsh code becomes available for use in multi-coding the F-PDCH but will be unavailable for such use until and updated WMB message is transmitted. Of course, the default value of m can be set to any desired value, and incrementally adjusted up or down as needed to maximum data throughput on the F-PDCH. Put simply, the base station 12 can be configured to transmit an updated WMB message responsive to m Walsh codes being unavailable for multi-coding until transmission of an updated WMB message.

In deciding whether and how to adjust the value of m, and therefore dynamically adjust the transmission frequency of WMB messages, the base station 12 is configured to track the net gain in data throughput on the F-PDCH obtained by transmission of the WMB messages. Net gain can be expressed as the difference between data throughput gains associated with increasing the number of Walsh code available for multi-coding the packet data channel via transmission of the Walsh Mask Broadcast messages, and data throughput losses associated with forfeiting transmit slots on the packet data channel for the transmission of the Walsh Mask Broadcast messages.

Thus, base station 12 can initialize the transmission frequency to an integer value m, wherein a Walsh Mask Broadcast message is transmitted every mth occurrence of a Walsh code becoming newly available for use in multi-coding the packet data channel (but remaining unavailable for such use until an updated WMB message is transmitted). According to that method, dynamically adjusting the transmission frequency to increase the net gain can comprise increasing and decreasing the value of m as needed to optimize the data throughput of the packet data channel. Thus, under closed-loop control monitoring of the net throughput gain, the value of m can be incrementally increased-thereby decreasing the transmission frequency—for so long as those increases result in net gains in data throughput, or can be incrementally decreased—thereby increasing transmission frequency—down to a minimum value of 1 for so long as those decreases result in net gains in data throughput.

In the 1xEV-DV context, then, the present invention addresses the task of determining the frequency of WMB message transmissions that maximizes the forward link sector throughput of the F-PDCH. As the broadcast frequency is increased, the average number of Walsh codes available for multi-coding the F-PDCH increases, thereby resulting in increased throughput, but each broadcast requires a time slot that is lost to user traffic. Therefore, base station 12 can be configured as explained above to determine dynamically some optimal frequency that optimizes the tradeoff between increased throughput and "wasted" time slots. In particular, base station 12 can be configured to monitor the throughput increase that result from an increase in the available Walsh codes, and to monitor the throughput that is lost to the broadcast slot(s). These offsetting influences on data throughput can then be compared to determine whether the broadcast frequency should be increased or decreased.

Figures 7, 8:
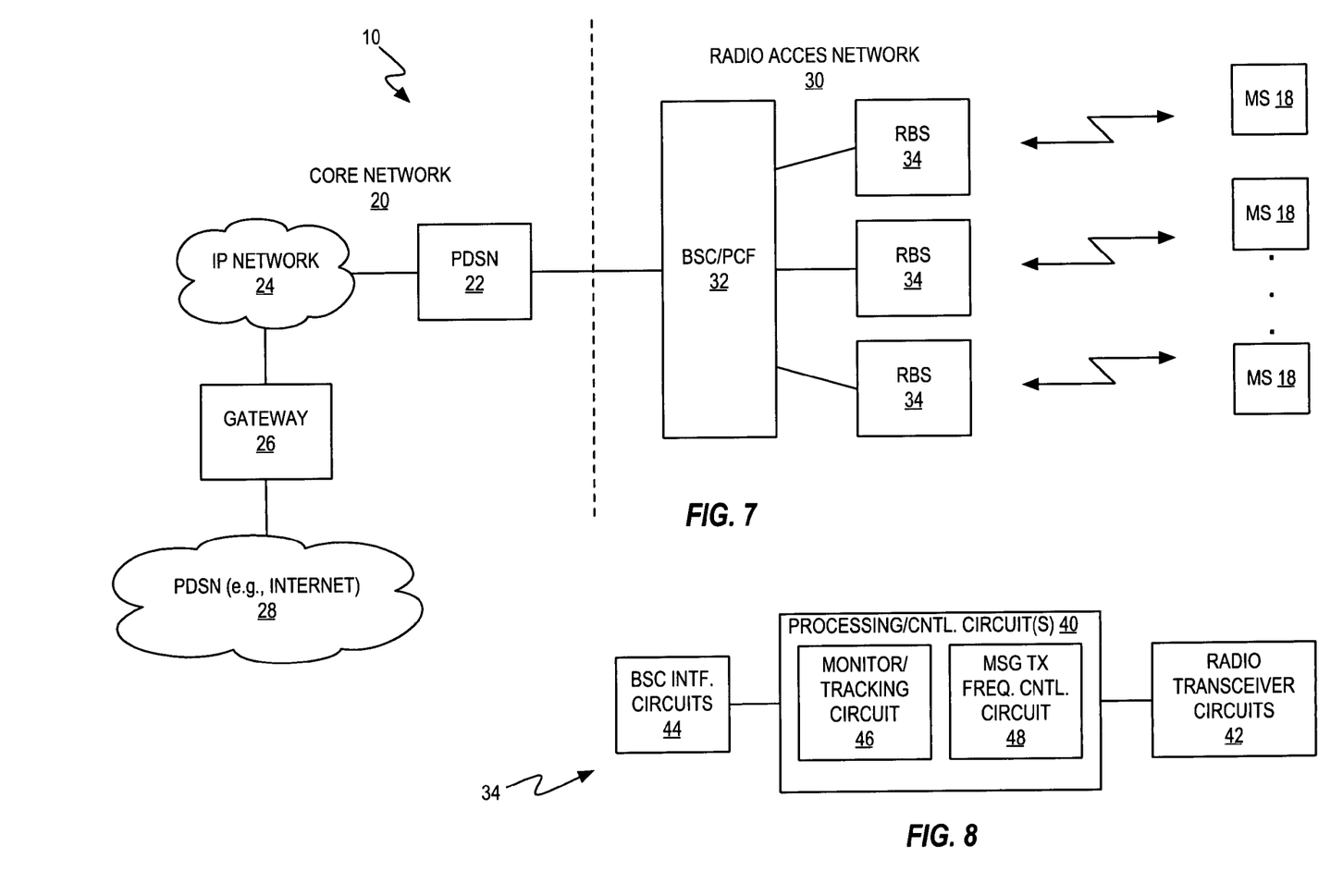
FIG. 7 illustrates a 1xEV-DV-based embodiment of the wireless communication network introduced in FIG. 1.
FIG. 8 illustrates a radio base station that includes one or more processing circuits that are configured to carry out selective transmission of the spreading code information update message in accordance with one or more embodiments of the present invention.

As for implementing the above base station processing in the 1xEV-DV context, FIG. 7 illustrates wireless communication network 10 implemented as a 1 xEV-DV wireless communication network comprising a core network 20 that includes a Packet Data Serving Node (PDSN) 22, and IP network 24, and a Gateway 26 that is communicatively coupled to one or more Public Data Networks (PDNs) 28. Network 10 further comprises a Radio Access Network (RAN) 30, which includes a Base Station Controller/Packet Control Function (BSC/PCF) 32 and one or more Radio Base Stations (RBSs) 34 that are configured for wirelessly communicating with a plurality of mobile stations 18.

The term "base station" as used herein encompasses circuitry at one or both the BSC 32 and the RBS 34. Thus, in one embodiment, the present invention's method of dynamically controlling the transmission frequency of WMB messages is implemented at the RBS level, wherein an RBS 34 is configured to carry out dynamic adjustment of the transmission frequency of the WMB message. The illustrated RBS 34 comprises processing/control circuits 40, radio transceiver circuits 42, and BSC interface circuits 44. Of particular interest with regard to the dynamic adjustment of the WMB message transmission frequency, processing/control circuits 40 include a monitor/tracking circuit 46 and a message transmission frequency control circuit 48.

The monitor/tracking circuit 46, which may comprise hardware, software, or any combination thereof, monitors the throughput gains and losses associated with adding otherwise unavailable Walsh codes to the F-PDCH multi-coding set via WMB message transmission. From that monitoring, the net gain is calculated and that net gain value can be used to drive adjustment of the WMB message frequency by the transmission frequency control circuit 48. For example, control circuit 48 can increase the transmission frequency and the net gain can be monitored for a desired control interval. If the increase in transmission frequency resulted in a positive net gain in data throughput, the transmission can be increased again, and so on. If the increase in transmission frequency resulted in a negative change in net gain, the control circuit 48 would instead decrease the transmission frequency for the next control interval.

It should be understood that the control interval used can be varied and, indeed, it should be understood that the overall methodology is not limited to a particular control interval, nor to particular values of incremental transmission frequency adjustments. Instead, the present invention broadly provides for dynamically controlling the transmission of WMB messages, or the like, to improve data throughput on the corresponding shared packet data channel. As such, the present invention is not limited to the embodiments disclosed in the foregoing discussion; rather it is limited only by the following claims and their reasonable legal equivalents.

What is claimed is:

1. A method of controlling a transmission frequency of Walsh Mask Broadcast messages transmitted by a base station in a wireless communication network for a shared, forward link packet data channel comprising:
   tracking a net gain in data throughput for the packet data channel obtained by transmitting Walsh Mask Broadcast messages to mobile stations being served on the packet data channel; and
   dynamically adjusting the transmission frequency to increase the net gain by incrementally increasing the transmission frequency if the net gain is increasing responsive to said incremental increases and incrementally decreasing the transmission frequency if the net gain is increasing responsive to said incremental decreases.

2. The method of claim 1, wherein dynamically adjusting the transmission frequency of the Walsh Mask Broadcast messages to increase the net gain comprises incrementally increasing or decreasing a default value for the transmission frequency as a function of tracking the net gain.

3. The method of claim 1, wherein tracking the net gain comprises expressing the net gain as a difference between data throughput gains associated with increasing the number of Walsh code available for multi-coding the packet data channel via transmission of the Walsh Mask Broadcast messages, and data throughput losses associated with forfeiting transmit slots on the packet data channel for the transmission of the Walsh Mask Broadcast messages.

4. The method of claim 1, wherein dynamically adjusting the transmission frequency to increase the net gain comprises constraining adjustments in ether increasing or decreasing the transmission frequency to a desired rate of adjustment.

5. The method of claim 1, further comprising initializing the transmission frequency to an integer value m, wherein a Walsh Mask Broadcast message is transmitted every mth ccurrence of a Walsh code becoming newly available for use in multi-coding the packet data channel.

6. The method of claim 5, wherein dynamically adjusting the transmission frequency to increase the net gain comprises increasing and decreasing the value of m as needed to optimize the data throughput of the packet data channel.

7. The method of claim 1, wherein the wireless communication network comprises a 1xEV-DV wireless communication network, and wherein the packet data channel comprises a Forward Packet Data Channel (F-PDCH) being transmitted by a base station comprising part of the 1xEV-DV wireless communication network.

8. A base station for use in a wireless communication network, said base station configured to transmit a shared, forward link packet data channel and comprising one or more processing circuits configured to:
   track a net gain in data throughput for the packet data channel obtained by transmitting Walsh Mask Broadcast messages to mobile stations being served on the packet data channel; and
   dynamically adjust a transmission frequency of the Walsh Mask Broadcast messages to increase the net gain by incrementally increasing the transmission frequency if the net gain increases responsive to said incremental increases and incrementally decreasing the transmission frequency if the net gain increases responsive to said incremental decreases.

9. The base station of claim 8, wherein the one or more processing circuits comprise one or more microprocessor circuits configured to track the net gain and dynamically adjust the transmission frequency of the Walsh Mask Broadcast messages.

10. The base station of claim 8, wherein the one or more processing circuits comprise a monitoring circuit configured to track the net gain based on monitoring a difference between data throughput increases and data throughput losses on the Packet data channel associated with transmitting the Walsh Mask Broadcast messages, and a control circuit configured to increase and decrease the transmission frequency of the Walsh Mask Broadcast messages, as needed, responsive to the monitoring circuit.

11. The base station of claim 8, wherein the one or more processing circuits are configured to track the net gain by expressing the net gain as a difference between data throughput gains associated with increasing the number of Walsh code available for multi-coding the packet data channel via transmission of the Walsh Mask Broadcast messages, and data throughput losses associated with forfeiting transmit slots on the packet data channel for the transmission of the Walsh Mask Broadcast messages.

12. The base station of claim 8, wherein the one or more processing circuits are configured to constrain adjustment of the transmission frequency to a desired rate of adjustment.

13. The base station of claim 8, wherein the one or more processing circuits are configured to initialize the transmission frequency to an integer value m, wherein a Walsh Mask Broadcast message is transmitted every mth occurrence of a Walsh code becoming newly available for use in multi-coding the packet data channel.

14. The base station of claim 13, wherein the one or more processing circuits are configured to adjust the transmission frequency dynamically to increase the net gain by increasing and decreasing the value of m as needed to optimize the data throughput of the packet data channel.

15. The base station of claim 8, wherein the one or more processing circuits are configured to adjust the transmission frequency dynamically to increase the net gain by increasing and decreasing the transmission frequency as needed to optimize the data throughput of the packet data channel.

16. The base station of claim 8, wherein the network comprises a 1xEV-DV wireless communication network, and wherein the base station comprises a 1xEV-DV radio base station configured for operation in the 1xEV-DV wireless communication network.

17. At a base station using leftover spreading codes for multi-coding a shared packet data channel, a method of adding spreading codes to the multi-coding set based on messaging the mobile stations sharing the packet data channel, the method comprising:
   determining that one or more spreading codes in an overall set of spreading codes have become newly available for use in multi-coding the shared packet data channel; and
   selectively messaging the mobile stations sharing the packet data channel based on determining whether a data throughput increase gained by adding the one or more spreading codes to the multi-coding set outweighs a data throughput loss incurred by forfeiting data transmission time on the shared packet data channel in order to carry out the messaging.

18. The method of claim 17, wherein the base station comprises a 1xEV-DV base station and the shared packet data channel comprises a Forward Packet Data Channel (F-PDCH) being transmitted by the 1xEV-DV base station, and wherein selectively messaging the mobile stations comprises selectively sending a Walsh Mask Broadcast message from the 1xEV-DV base station for the F-PDCH.

19. The method of claim 17, wherein determining that one or more spreading codes in an overall set of spreading codes have become newly available for use in multi-coding the shared packet data channel comprises identifying whether an appropriate length Walsh code is freed for multi-coding the shared packet data channel responsive to tracking the ongoing allocations and deallocations of Walsh codes for dedicated channels being transmitted by the base station.

20. The method of claim 17, further comprising beginning with a default messaging behavior comprising messaging the mobile stations sharing the packet data channel each time one or more spreading codes become newly available for multi-coding the shared packet data channel, tracking over time a net gain from said messaging as the difference between the data throughput increase gained and the data throughput loss incurred, and, subsequently, selectively not messaging the mobile stations sharing the packet data channel responsive to one or more spreading codes becoming newly available for multi-coding the shared packet data channel.

* * * * *